United States Patent
Trafton et al.

[11] Patent Number: 6,016,984
[45] Date of Patent: Jan. 25, 2000

[54] SPOOLLESS FILM TAKEUP CHAMBER WITH IMPROVED SPOOLING SPRING

[75] Inventors: R. Winfield Trafton, Holley; John F. Miller, Rochester, both of N.Y.

[73] Assignee: Eastman Kodak Company, Rochester, N.Y.

[21] Appl. No.: 09/183,259

[22] Filed: Oct. 30, 1998

[51] Int. Cl.[7] .................................................. G03B 23/02
[52] U.S. Cl. ..................................... 242/348.1; 242/348.4
[58] Field of Search .............................. 242/535.1, 348, 242/348.4, 358, 358.1, 348.1

[56] References Cited

U.S. PATENT DOCUMENTS

| | | |
|---|---|---|
| 1,694,401 | 12/1928 | Slocum . |
| 1,799,184 | 4/1931 | Slocum et al. . |
| 2,236,917 | 4/1941 | Pollock . |
| 2,336,278 | 12/1943 | Mihalyi . |
| 2,484,248 | 10/1949 | Roehrl . |
| 3,276,341 | 10/1966 | Kremp et al. ........................ 242/348.1 |
| 3,288,388 | 11/1966 | Winkler . |
| 3,288,389 | 11/1966 | Gersch et al. . |
| 3,322,366 | 5/1967 | Hayden . |
| 3,333,785 | 8/1967 | Baur et al. . |
| 3,715,963 | 2/1973 | LeCover . |
| 3,823,891 | 7/1974 | Schrader ............................. 242/348.1 |
| 4,060,210 | 11/1977 | Norris . |
| 4,166,588 | 9/1979 | Krehbiel et al. ..................... 242/348.1 |
| 4,482,232 | 11/1984 | Engelsmann et al. . |
| 5,385,317 | 1/1995 | Yamamoto et al. . |
| 5,746,388 | 5/1998 | Raimondi, Jr. . |

*Primary Examiner*—John M. Jillions
*Attorney, Agent, or Firm*—Francis H. Boos, Jr.

[57] ABSTRACT

A spoolless film takeup chamber with a pair of expandable film coiling springs. The springs are flat springs coiled generally in a spiral configuration. The thickness of the springs varies from the point at which the springs are attached to the inner takeup chamber out to the free, distal ends of the springs such that the thickness at the distal end is less than the thickness at end attached to chamber. Preferably the thickness decreases continuously from the attached ends to the distal ends of the spring. The effect is to reduce the spring rate at the outer ends of the springs thereby maintaining a relatively constant spring force on the film as the diameter of the film coil grows as compared to springs with a constant spring rate along the length of the springs. Additionally, the radius of curvature of a segment of each spring at the distal end is longer than the radius of curvature at an intermediate segment of the spring to better conform the spring to the outer circumference of the film coil thereby avoiding interference between the ends of the springs and features on the film such as perforations.

12 Claims, 3 Drawing Sheets

SPOOLLESS FILM TAKEUP CHAMBER WITH IMPROVED SPOOLING SPRING

FIELD OF THE INVENTION

The invention relates generally to the field of photographic apparatus, and in particular to film takeup chambers used in such apparatus.

BACKGROUND OF THE INVENTION

In film transport systems, it is well known to use a spoolless takeup chamber to temporarily hold the free end of the filmstrip in a compact cylindrical volume. Such chambers are known to employ a curvilinear spring coaxial with the cylinder, the spring having a radius in its relaxed state which is much smaller than the radius of the chamber. When film is initially thrust into the chamber the spring forms the film into a tight coil. With continued insertion of the film, the spring diameter expands as the diameter of the film coil grows. This arrangement allows the film coil to rotate as the inserted film is lapped onto the outer circumference of the film coil thereby substantially eliminating sliding friction between adjacent film surfaces which would cause damage to the film emulsion. The sliding friction would also cause binding of the film in the chamber which would severely limit the ability to thrust any significant length of film into the chamber.

U.S. Pat. No. 5,746,388 discloses a film takeup chamber that utilizes a pair of spaced-apart, expandable, coiled wire springs to form the film into a rotatable film coil with minimal contact between the circumferential film surface and the wire coil. However, the spring wires for this purpose are very small diameter wires which requires that the free ends of the springs be constrained in special slots formed in the takeup chamber walls to avoid twisting and lateral motion of the springs as the film coil grows in diameter. This increases the cost and complexity of the chamber design.

The use of flat springs in spoolless film takeup chambers is known and avoids the need for special constraint slots in the chamber design. A representative example of the use of flat takeup springs in a film takeup chamber is shown in U.S. Pat. NO. 3,288,388. This patent recognizes the problem that as the outer diameter of the film coil increases, the film coil tends to expand and flatten the spring so that a portion of the coil no longer extends along an arc of a circle and, as a result, the spring presses with a non-uniform pressure against the coil of film, deforming the film. The solution proposed in this patent is to add a free wheeling center spool to maintain the film in cylindrical coil form against the uneven spring pressures. This adds undesired cost and complexity to the chamber design and further does not alleviate the problem of excess frictional forces against the film surface caused by the increasing spring forces exerted as the spring flattens out.

SUMMARY OF THE INVENTION

It is an object of the invention therefore to provide a spoolless film takeup chamber utilizing a flat takeup film coiling spring that avoids the above described disadvantages of prior known spoolless takeup chambers.

It is a further object of the invention to provide a film takeup chamber of the type described that forms the film into a uniform, expanding cylindrical coil in a compact volume with a minimum of frictional force exerted on the film coil outer circumference as the film coil expands.

To this end there is provided a spoolless film takeup chamber which comprises a housing having a side wall and end walls, said side wall defining an inner chamber and an axially extending film entry slot for insertion of a film strip into the inner chamber; and at least one flat spring formed in a coil having a first end supported on the inner chamber wall and a distal end which is free to expand with growing diameter of a film coil formed inside the spring coil, the spring having a spring rate characteristic that decreases along the length of the spring leading from said first end to the distal end thereof. In one preferred embodiment of the invention, the coil spring has a thickness which decreases along the length of the spring leading from the first end of the spring to the distal end thereof. In a further preferred embodiment, the coil shape of the spring is such that the radius of curvature of a segment of the spring at the distal end thereof is greater than the radius of curvature of a segment of the spring intermediate the first end and the distal end thereby providing a uniform conformance of the distal end of the spring to the outer circumference of the film coil as the diameter of the film coil grows.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
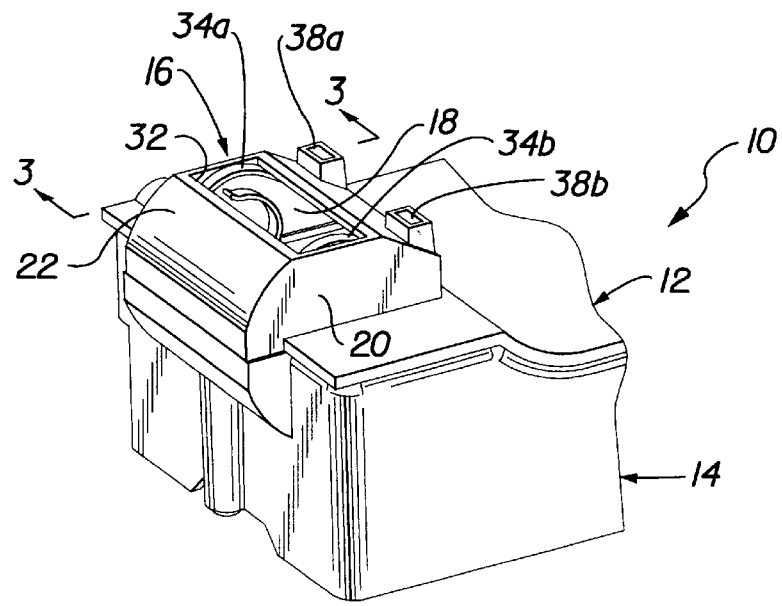
FIG. 1 is a perspective view of a portion of a photographic film scanner illustrating a spoolless film takeup chamber of the present invention.
Figure 2:
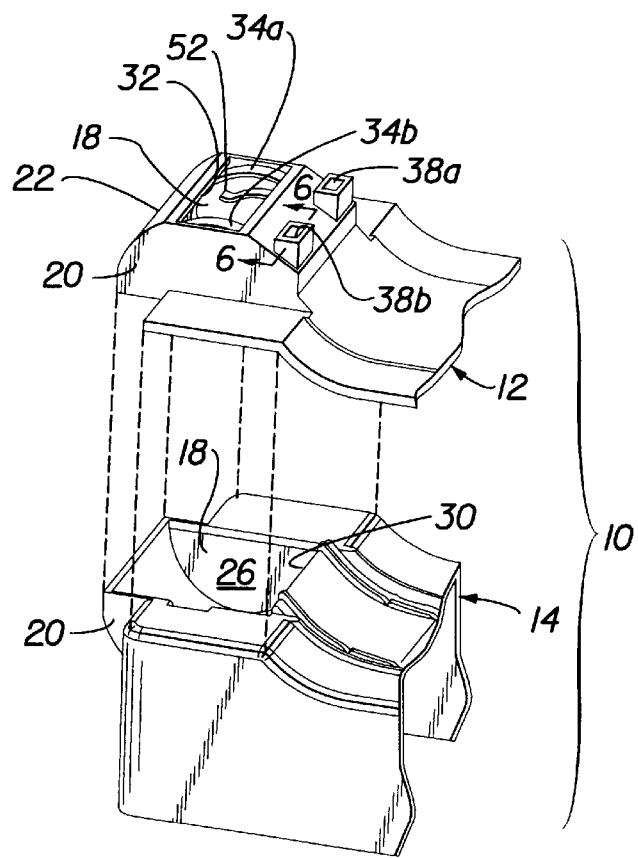
FIG. 2 is an exploded perspective view of the takeup chamber of FIG. 1.

Referring jointly to FIGS. 1 and 2, there is shown an end portion of a film scanner 10 which is more fully described in copending U.S. Application Ser. No. 09/083,604. The portion illustrated herein comprises an upper plate 12 and a lower frame 14 which, when assembled as shown in FIG. 1, terminate in a spoolless film takeup chamber 16 comprising end walls 18, 20 and an axially extending side wall 22. The side and end walls define an inner chamber 26 and an axially extending film entry slot 30 (FIG. 3) allowing insertion of an elongated film strip 31 (FIG. 4) into the inner chamber. The side wall may be curved as shown to form a cylindrical configuration for the inner chamber although this is optional and other internal configurations are possible. An upper portion of the side wall is cut along a chord line to form an opening 32. In an actually constructed film scanner, this is done to provide a compact vertical design. Inside the chamber, a pair of flat coil springs 34a and 34b are mounted in retention slots 38a and 38b, respectively. The springs are mounted adjacent to, but preferably spaced from, the end walls 18 and 20, respectively. The location and spacing of the springs is primarily determined by the width of the film strip such that the springs engage the outer edges of the film strip, preferably outside the image frame areas of the film.

Figure 3:
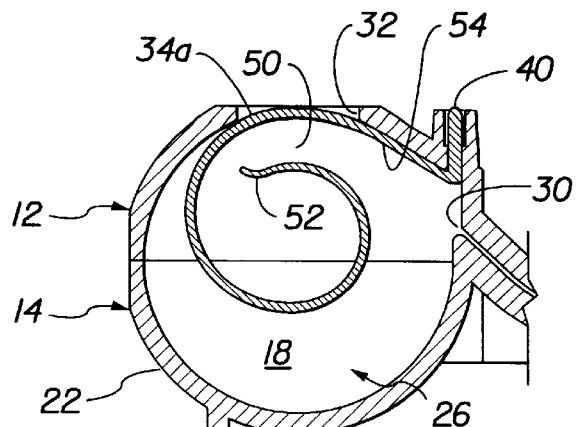
FIG. 3 is a side cross section view of the takeup chamber of FIG. 1 illustrating a novel flat coil spring in accordance with a feature of the invention.
Figure 4:
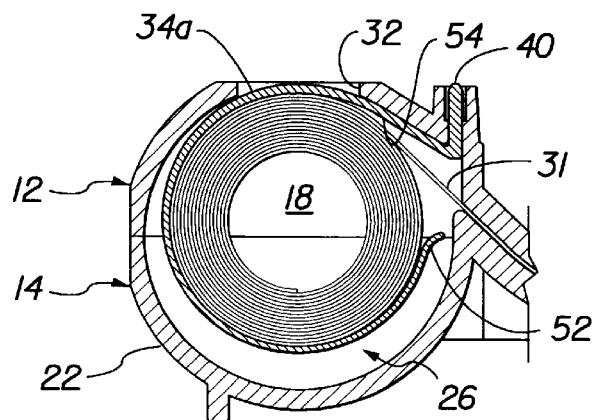
FIG. 4 is a side cross section view of the FIG. 1 takeup chamber similar to FIG. 3 but with the flat coil spring expanded by a roll of coiled film.
Figure 5:
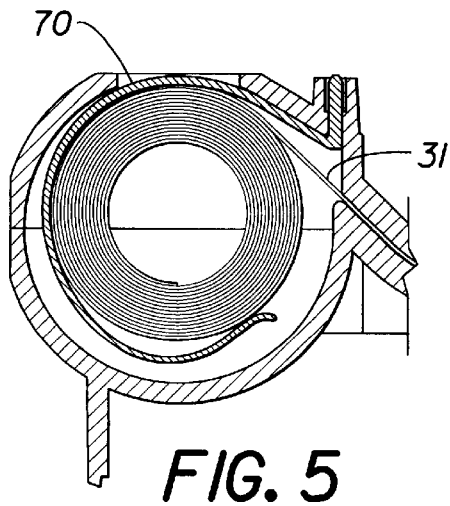
FIG. 5 is a view similar to FIG. 4 but utilizing a prior art coil spring which illustrates a disadvantage thereof.
Figure 6:
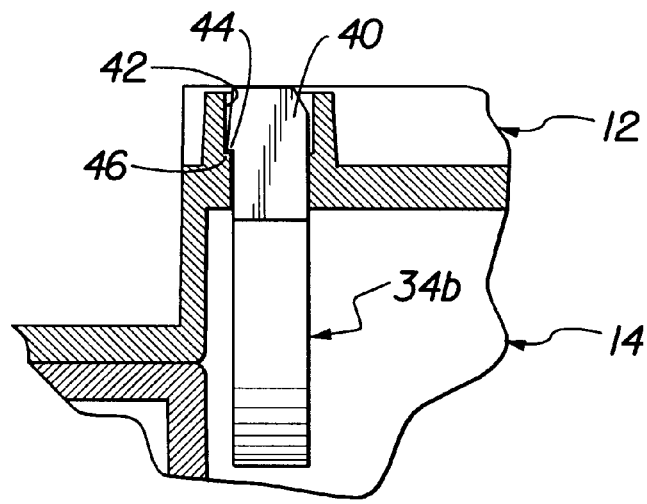
FIG. 6 is a partial cross section view of the FIG. 1 chamber illustrating the spring mount arrangement.

FIG. 3 shows an interior cross section view of the takeup chamber 16 taken through coil spring 34a. Spring 34a is retained at a first (base) end 54 of the spring by means of a prong 40 integrally formed on the spring and that fits into retention slot 38a. As seen in FIG. 6, prong 40 is provided with a ramp portion 42 that facilitates entry of the prong 40 into the retention slot 38a. The lower end of the ramp portion 42 terminates in a shoulder 44 which engages shoulder 46 in the retention slot to lock the spring into position within the chamber. Reverting to FIG. 3, the spring 34a is formed generally in a spiral configuration to have a film entry mouth 50 that faces the axially extending film entry slot 30 created when the upper plate 12 and lower frame 14 are mated as shown. The distal or tip end 52 of the spring is left free to allow radial expansion of the spring as film is thrust into the spring and rolled into a coil as shown in FIG. 5. In accordance with an important aspect of the invention, the radial thickness of the spring is greater at first or base end 54 of the spring than at the tip end 52 and in a preferred form of the invention, the thickness decreases gradually from the base end to the tip end. In an actual embodiment of the invention, the thickness at the base end is 0.635 mm and at the tip end is 0.432 mm. Preferably, the spring is fabricated from a suitable plastic material molded to have the desired varying thickness along the length of the spring, the material having a suitably high yield stress to accomplish the function described herein. A suitable material for this purpose is an acetal copolymer, such as an acetal copolymer available under the name Celcon M450. By decreasing the thickness of the spring along its length from base to tip, the spring rate decreases along the length thereby maintaining a fairly constant spring force against the outer circumference of the film coil as the spring is expanded outwardly from its original shape with the growing diameter of the film coil. This feature obviates the problem with constant thickness coil springs, referred to in the aforementioned '388 patent, of the increasing spring force which is exerted at the outer surface of the film coil as the diameter of the film coil increases and which, as illustrated by the constant thickness spring 70 in FIG. 5, tends to prevent uniform conformance of the spring to the outer circumference of the film coil.

Figure 7:
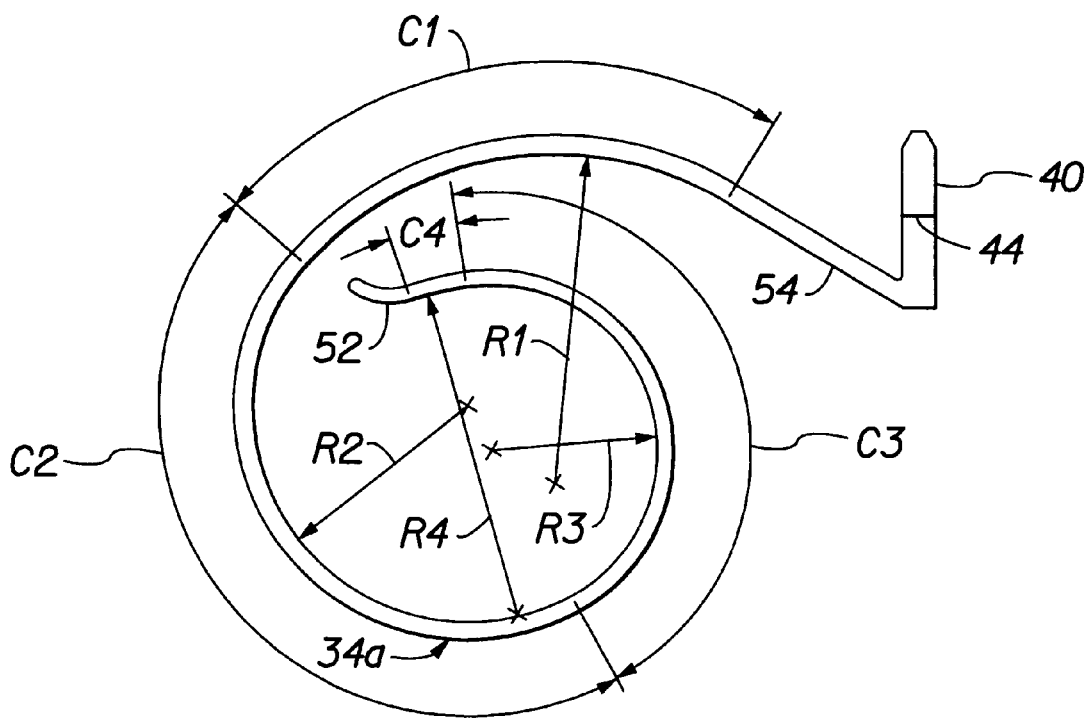
FIG. 7 is a side elevation view of the flat coil spring of FIG. 3 illustrating certain novel details of the spring configuration.

Additionally, while the spring 34a is formed generally as a spiral coil in which the radius of curvature of the coil decreases along the length of the coil proceeding from the base end 54 toward the tip end 52, the actual form of the spring 34a is modified such that the radius of curvature, at least for a segment at the tip end 52 is longer than the radius of curvature of an intermediate segment of the spring. This is shown in FIG. 7 wherein the spring 34a has segments C1, C2 and C3 proceeding from the base end 54 to the tip end 52 which are formed with three decreasing length radii of R1, R2 and R3, respectively. However, for the final segment C4 at the tip end 52, the radius R4 is made longer than the radius R3 for the preceding segment C3. The reason for this is that the longer final radius shapes the end of the spring to provide for a smooth engagement of the tip end of the spring with the outer circumference of the film coil. If the radius of curvature continued to decrease all the way to the extreme end of the spring, the force of the spring would be such that the spring would, as shown in FIG. 5, be less likely to conform smoothly with the outer surface of the film coil and would be more likely to bind or catch on perforations in the film at the film edge. By increasing the radius of curvature of the spring at the tip end as compared to the segment of the spring that precedes the tip end, a smooth conforming fit of the spring to outer surface of the film coil is realized and the likelihood of interference of the spring tip with film perforations is substantially reduced, if not eliminated altogether. In an actual embodiment of the spring, the arcuate segment length and radii lengths, as set forth in Table A below, were successfully used, although it will be appreciated that the invention is not limited to the indicated example dimensions.

TABLE A

| No. | C. | R |
|---|---|---|
| 1 | 80° | 10 mm |
| 2 | 160° | 6.5 mm |
| 3 | 160° | 5 mm |
| 4 | 10° | 10 mm |

The invention has been described in detail with particular reference to certain preferred embodiments thereof, but it will be understood that variations and modifications can be effected within the spirit and scope of the invention.

Parts List

10 film scanner
12 upper plate
14 lower frame
16 film takeup chamber
18, 20 end walls
22 side wall
26 inner chamber
30 film entry slot
31 film strip
32 opening
34a, b flat coil springs
38a, b retention slots
40 prong
42 ramp portion
44, 46 shoulder
50 film entry mouth
52 tip end
54 base end
70 prior art coil spring

What is claimed is:

1. A spoolless film takeup chamber comprising:
   a housing having a side wall and end walls, said walls defining an inner chamber and an axially extending film entry slot for insertion of a film strip into the inner chamber; and
   at least one elongated flat spring formed in a coil having a first end supported on the inner chamber and a distal end which is free to expand with growing diameter of a film coil formed inside the spring coil, the spring having a spring rate characteristic that decreases along the length of the spring leading from said first end to the distal end thereof.

2. The chamber of claim 1 wherein the spring rate of the spring decreases continuously along the length of the spring.

3. The chamber of claim 1 wherein the spring has an inner radius of curvature along a segment of the spring at the distal end thereof which is greater than the inner radius of curvature of an intermediate segment of the spring.

4. The chamber of claim 1 wherein the spring has a thickness which decreases along the length of the spring leading from said first end to the distal end thereof.

5. The chamber of claim 4 wherein the spring thickness decreases continuously along the length of the spring.

6. A spoolless film takeup chamber comprising:

a housing having a side wall and end walls, said side wall defining an inner chamber and an axially extending film entry slot for insertion of a film strip into the inner chamber; and a pair of flat springs each formed in a coil with one end attached to the inner chamber adjacent the entry slot to form film inserted into the coil into an initial cylindrical film coil having a diameter defined by the initial coil diameter of the springs, the distal end of the springs being free to expand as the diameter of the film cylinder grows with continued insertion of the film, the thickness of the springs being greater near the end attached to the inner chamber than near the distal end of the springs.

7. The takeup chamber of claim 6 wherein the thickness of the flat coil springs decreases continuously from a point near the first end attached to the inner chamber to the distal end of the spring.

8. The takeup chamber of claim 6 wherein said coil springs have a radius of curvature which changes along the length of the springs, the radius of curvature along a segment of the coil spring near the distal end of the spring is greater than the radius of curvature of at least an intermediate segment of the spring.

9. In a spoolless film takeup chamber of the type having a flat spiral coil film which is affixed to the chamber at a first end for coiling film into a rotating film coil as the film is thrust into the chamber, the spring having a free tip end which expands outwardly as the diameter of the film coil grows, the improvement in which radial thickness of the spring is greater at the first end of the spring than at the tip end of the spring.

10. The improvement of claim 9 in which the spring further has a radius of curvature along a segment thereof at the tip end which is greater than the radius of curvature of the spring along a segment thereof which precedes the tip end.

11. In a spoolless film takeup chamber of the type having a flat spiral coil film which is affixed to the chamber at a first end for coiling film into a rotating film coil as the film is thrust into the chamber, the spring being formed in the longitudinal direction generally as a spiral coil having a free tip end which expands outwardly as the diameter of the film coil grows, the improvement in which radial thickness of the spring decreases gradually in the longitudinal direction of the spring from the first end to the tip end of the spring.

12. The improvement of claim 11 in which the spring further has a radius of curvature along a segment thereof at the tip end of which is greater than the radius of curvature of the spring along a segment thereof which precedes the tip end.

\* \* \* \* \*